(12) United States Patent
Barker et al.

(10) Patent No.: US 9,605,653 B2
(45) Date of Patent: Mar. 28, 2017

(54) SYSTEM AND METHOD FOR DE-RATING POWER OF A WIND TURBINE AS A FUNCTION OF TEMPERATURE

(71) Applicant: General Electric Company, Schenectady, NY (US)

(72) Inventors: Sidney Allen Barker, Troutville, VA (US); Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 14/721,100

(22) Filed: May 26, 2015

(65) Prior Publication Data
US 2016/0348646 A1 Dec. 1, 2016

(51) Int. Cl.
*F03D 9/00* (2016.01)
*F03D 7/00* (2006.01)

(52) U.S. Cl.
CPC .............. *F03D 7/00* (2013.01); *F03D 9/002* (2013.01)

(58) Field of Classification Search
CPC .................................. F03D 7/00; F03D 9/002
USPC ......... 290/44, 55; 415/1; 700/286, 287, 288; 416/1
See application file for complete search history.

(56) References Cited

U.S. PATENT DOCUMENTS

| | | | |
|---|---|---|---|
| 7,586,205 B2 | 9/2009 | Krueger | |
| 8,022,565 B2 | 9/2011 | Scholte-Wassink et al. | |
| 8,046,109 B2 | 10/2011 | Larsen et al. | |
| 8,120,194 B2 * | 2/2012 | Hoffmann | H02P 9/04 290/44 |
| 8,569,904 B2 | 10/2013 | Gundtoft et al. | |
| 8,575,773 B2 * | 11/2013 | Tripathi | H02P 9/12 290/44 |
| 8,738,192 B2 * | 5/2014 | Uphues | F03D 7/0224 290/44 |
| 2008/0112807 A1 * | 5/2008 | Uphues | F03D 7/0224 416/1 |
| 2008/0150282 A1 * | 6/2008 | Rebsdorf | F03D 7/0284 290/44 |
| 2009/0243296 A1 * | 10/2009 | Letas | F03D 7/00 290/44 |
| 2010/0207397 A1 * | 8/2010 | Kestermann | H02P 1/18 290/55 |
| 2011/0182712 A1 | 7/2011 | Nayebi et al. | |

(Continued)

OTHER PUBLICATIONS

Co-Pending U.S. Appl. No. 14/105,912, filed Dec. 11, 2013.

*Primary Examiner* — Julio C. Gonzalez R.
(74) *Attorney, Agent, or Firm* — Dority & Manning, P.A.

(57) ABSTRACT

The present subject matter is directed to a system and method for operating a wind turbine. The method includes measuring, via one or more temperature sensors, a local temperature of a component of the wind turbine for a predetermined time period. The method also includes determining a power capability of the wind turbine as a function of the local temperature. Another step includes measuring, via one or more sensors, a power output of the wind turbine for the predetermined time period. A further step includes determining a power margin of the wind turbine as a function of the power capability and the measured power output and controlling the power output of the wind turbine based, at least in part, on the power margin.

19 Claims, 5 Drawing Sheets

(56) References Cited

U.S. PATENT DOCUMENTS

| | | | | |
|---|---|---|---|---|
| 2013/0257052 | A1* | 10/2013 | Ha | H02P 5/00 |
| | | | | 290/44 |
| 2014/0015252 | A1* | 1/2014 | Zhu | F03D 7/0288 |
| | | | | 290/44 |
| 2014/0056706 | A1 | 2/2014 | Laurberg | |
| 2014/0062085 | A1* | 3/2014 | Larsen | H02J 3/386 |
| | | | | 290/44 |
| 2014/0253055 | A1* | 9/2014 | Wei | H02M 1/32 |
| | | | | 322/47 |
| 2015/0054281 | A1* | 2/2015 | Kamen | F03D 3/005 |
| | | | | 290/44 |
| 2015/0369216 | A1* | 12/2015 | Kisovec | F03D 3/068 |
| | | | | 290/44 |

* cited by examiner

SYSTEM AND METHOD FOR DE-RATING POWER OF A WIND TURBINE AS A FUNCTION OF TEMPERATURE

FIELD OF THE INVENTION

The present disclosure relates generally to wind turbines and, more particularly, to a system and method for de-rating power of a wind turbine as a function of a local temperature of a wind turbine component.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Many of the electrical components of the wind turbine are located down-tower. For example, such electrical components may include a power converter with a regulated DC link as well as down-tower cables. More specifically, some wind turbines, such as wind-driven doubly-fed induction generator (DFIG) systems or full power conversion systems, can include a power converter with an AC-DC-AC topology. Further, standard power converters typically include a bridge circuit and a power filter. In certain embodiments, the power converter may also include a crowbar circuit. In addition, the bridge circuit typically includes a plurality of cells, for example, one or more power switching elements and/or one or more diodes.

During operation, such electrical components can become damaged due to excessive temperatures as a result of the wind turbine trying to achieve maximum power generation.

Accordingly, a system and method that prevents such components from operating above a certain temperature would be advantageous. Thus, the present disclosure is directed to a system and method that de-rates the power output of the wind turbine as a function of a local temperature of a component in the wind turbine.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a wind turbine. The method includes measuring, via one or more temperature sensors, a local temperature of a component in the wind turbine for a predetermined time period. The method also includes determining a power capability of the wind turbine as a function of the local temperature. Another step includes measuring, via one or more sensors, a power output of the wind turbine for the predetermined time period. A further step includes determining a power margin as a function of the power capability and the measured power output so as to determine a power margin. Thus, the method also includes controlling the power output of the wind turbine based, at least in part, on the power margin.

In one embodiment, the local temperature of the component may include an actual temperature of the component, a temperature of an area containing the component, or a temperature inside of the component. For example, in a particular embodiment, the temperature sensors are configured to measure the temperature of the area containing a power conversion assembly of the wind turbine. Alternatively, the temperature sensors may be configured to directly measure the actual temperature of the power conversion assembly itself.

In another embodiment, the method may also include analyzing the measured local temperatures and/or the measured power outputs for the predetermined time period. More specifically, in certain embodiments, the method may include analyzing the measured local temperatures and/or the measured power outputs for the predetermined time period by filtering (e.g. via one or more filters) the measured local temperatures for the predetermined time period and/or the measured power outputs for the predetermined time period. In specific embodiments, the filter(s) may include any one of or combination of the following: a low pass filter, a high pass filter, a notch filter, or similar.

In further embodiments, the step of analyzing the measured local temperatures and/or the measured power outputs for the predetermined time period may include averaging the measured local temperatures for the predetermined time period and/or averaging the measured power outputs for the predetermined time period.

In additional embodiments, the step of controlling the power output of the wind turbine based, at least in part, on the power margin may include de-rating the power output of the wind turbine if the measured power output exceeds the power capability.

In certain embodiments, the component(s) in the wind turbine as described herein may include at least one of a power conversion assembly, a transformer, a generator, down-tower cables, turbine control hardware, yaw hardware, pitch hardware, or any other suitable component that experiences a temperature change as a result of a power change of the wind turbine. For example, in a particular embodiment, the component(s) to be monitored may include a down-tower power converter of the wind turbine.

In yet another embodiment, the step of controlling the power output of the wind turbine based, at least in part, on the power margin may include selecting to control the power output of the wind turbine based on at least one of the power margin or one or more additional power limiters of the wind turbine. More specifically, in certain embodiments, the additional power limiter(s) of the wind turbine may include at least one of a current, a voltage, a temperature, or any other suitable power limiting parameter of one or more wind turbine components. Further, in specific embodiments, the step of controlling the power output of the wind turbine based on the power margin may also include determining a power command for the wind turbine as a function of the selection and an existing power set point of the wind turbine. In yet another embodiment, the method may include limiting the power command such that the power command does not exceed the existing power output set point.

In another aspect, the present subject matter is directed to a method for operating a wind turbine. The method includes measuring, via one or more temperature sensors, a temperature of or near a power conversion assembly of the wind turbine for a predetermined time period. Another step includes determining a power capability of the wind turbine as a function of the temperature. Still a further step includes measuring, via one or more sensors, a power output of the wind turbine for the predetermined time period. The method also includes comparing the power capability with the measured power and de-rating the power output of the wind turbine when the measured power output exceeds the power capability.

In yet another aspect, the present subject matter is directed to a system for operating a wind turbine. The system includes one or more temperature sensors configured to measure a local temperature of at least one of a component in a wind turbine for a predetermined time period, one or more voltage and electric current sensors configured to measure a power output of the wind turbine for the predetermined time period, and a controller communicatively coupled to the temperature sensors and the voltage and electric current sensors. Further, the controller is configured to perform one or more operations, including but not limited to determining a power capability of the wind turbine as a function of the local temperature, comparing the power capability with the measured power output, and de-rating the power output of the wind turbine when the measured power output exceeds the power capability.

In further embodiments, the system may be further configured with any of the additional features as described herein. In addition, the system may be configured to implement any of the various methods steps as described herein. For example, in certain embodiments, the controller may include one or more filters configured to process at least one of the measured local temperatures for the predetermined time period and/or the measured power outputs for the predetermined time period. As mentioned, the filter(s) may include at least one of or a combination of the following: a low pass filter, a high pass filter, a notch filter, or similar.

In additional embodiments, the system may also include a selector configured to select between the power margin or one or more additional power limiters of the wind turbine to control the power output of the wind turbine. As such, the controller may also be configured to determine a power command for the wind turbine as a function of the selection and an existing power output set point of the wind turbine. In further embodiments, the system may also include a limiter configured to restrict the power command such that the power command does not exceed the existing power output set point.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a wind turbine. More specifically, the system is configured to protect one or more components of the wind turbine by de-rating the power output of the wind turbine as a function of a local temperature of the component(s). Thus, the present disclosure allows the wind turbine to maximize power output of the turbine while also maintaining component temperature within safe limits. Accordingly, for certain embodiments, effective use of the present disclosure depends on a relationship between the turbine power output and the temperature of the component. More specifically, the system of the present disclosure includes a plurality of sensors for measuring a local temperature of the component for a predetermined time period and/or for measuring a power output of the wind turbine for the predetermined time period. Thus, the system is configured to determine a power capability of the wind turbine as a function of the local temperature. As such, the power capability is determined by the component that is being protected. In addition, the system is configured to determine a power margin of the wind turbine as a function of the power capability and the measured power output. Thus, the system can then control the power output of the wind turbine, e.g. by de-rating the power output, based on the power margin.

More specifically, in certain embodiments, the system may determine a difference between the power capability and the measured power output, e.g. by subtracting the measured power output from the power capability. A negative power margin provides the necessary de-rating of the wind turbine to protect the components thereof. Further, since the temperatures of localized areas inside the wind turbine do not change instantaneously with an increase or a decrease in the power output of the turbine, de-rating of the power output of the turbine is not required to be fast and generally should not be fast. Therefore, de-rating the turbine as described herein protects the components of the turbine at a rate that is consistent with the rate of change of the local temperature that results from a change in the level of power. In addition, de-rating the power output of the turbine according to the present disclosure as a function of temperature allows the wind turbine to operate according to individual component capability. More specifically, as the local temperature increases from a combination of ambient temperature outside of the turbine and losses from inside the turbine that affect the local area, the capability of such components in that local area decreases. As such, the power output is also decreased to account for the temperature increases. Thus, the present disclosure maintains safe operating temperatures of the various components of the wind turbine while also maximizing the power output of the turbine.

Figure 1:
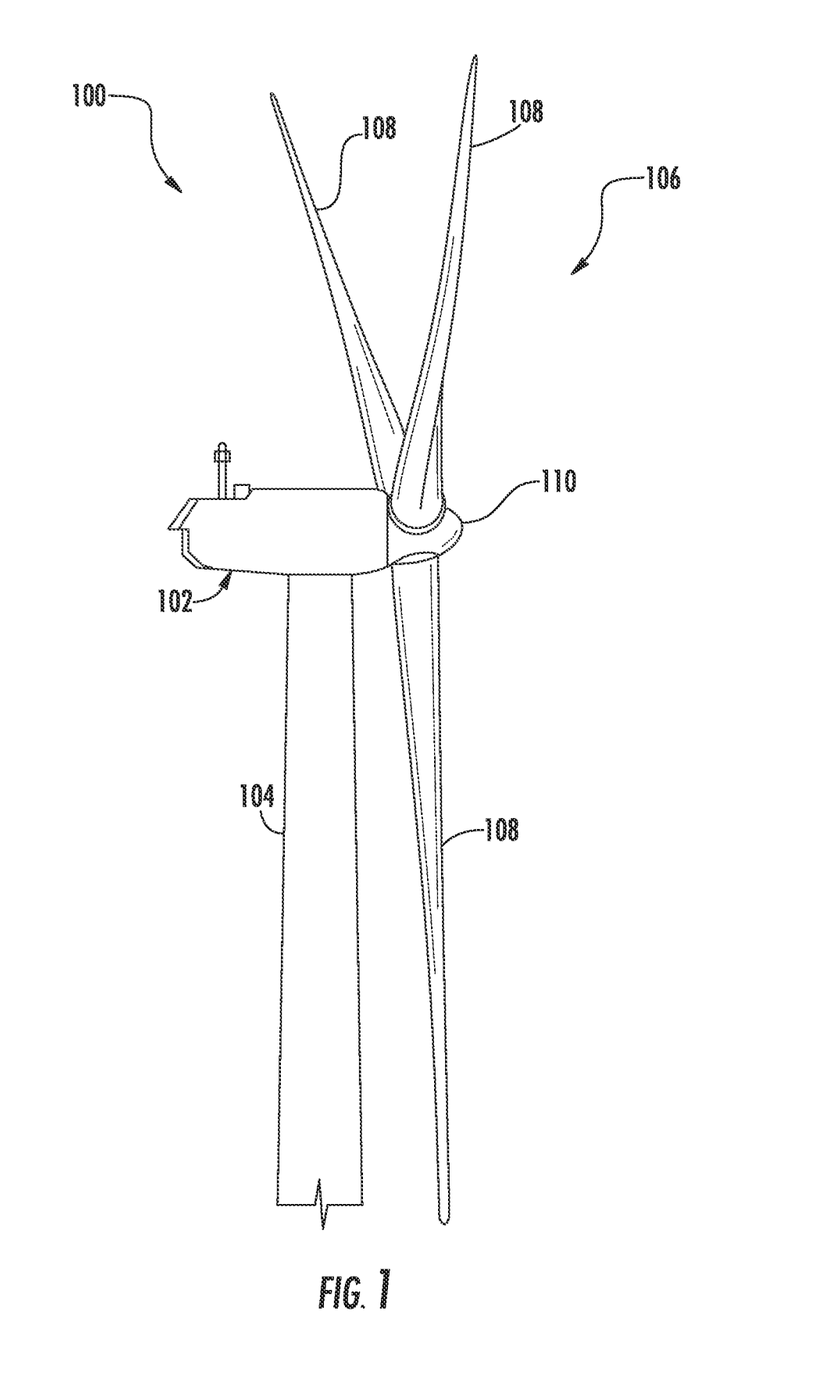
FIG. 1 illustrates a perspective view of a portion of one embodiment of a wind turbine according to the present disclosure.

Referring now to the drawings, FIG. 1 is a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
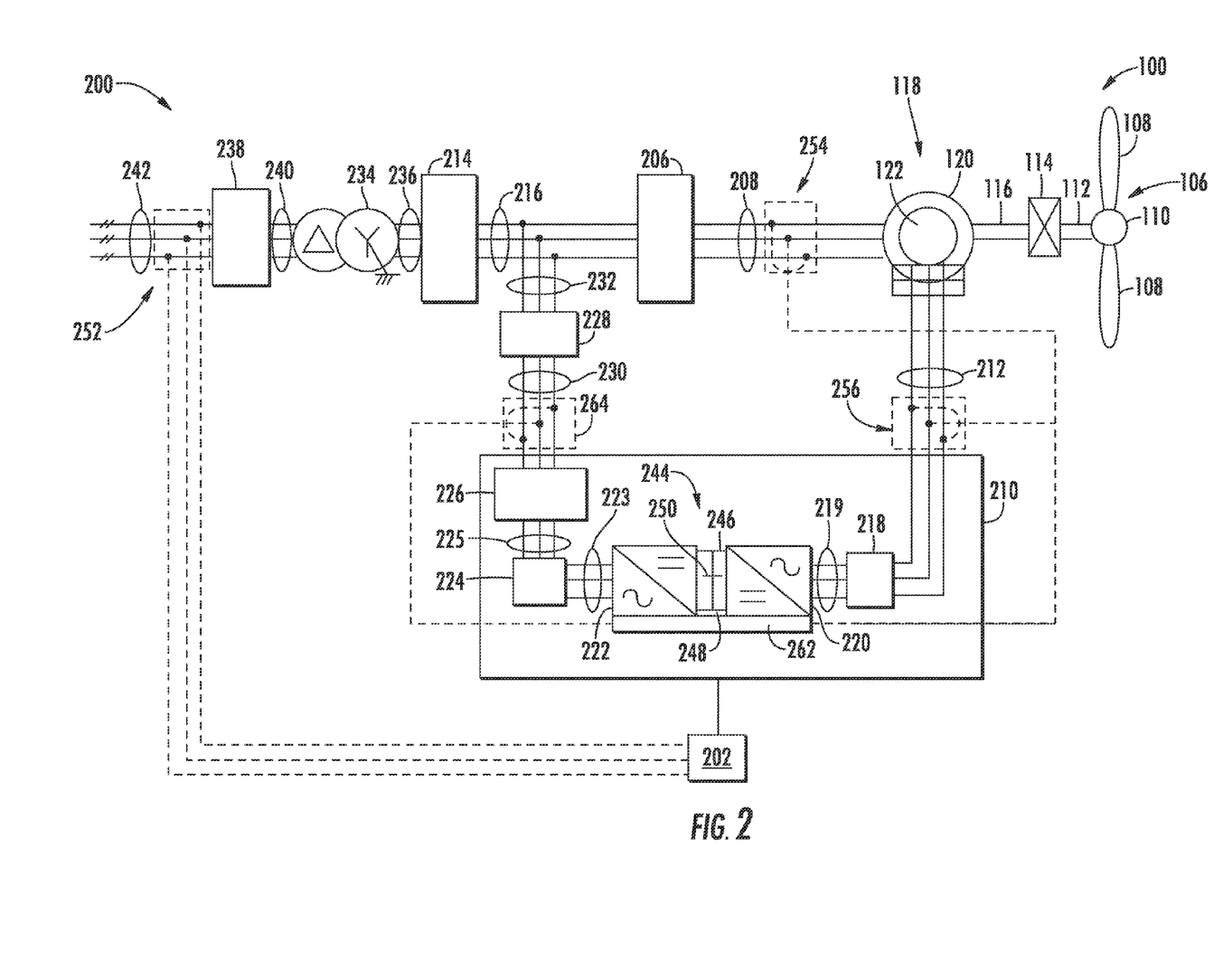
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

Figure 3:
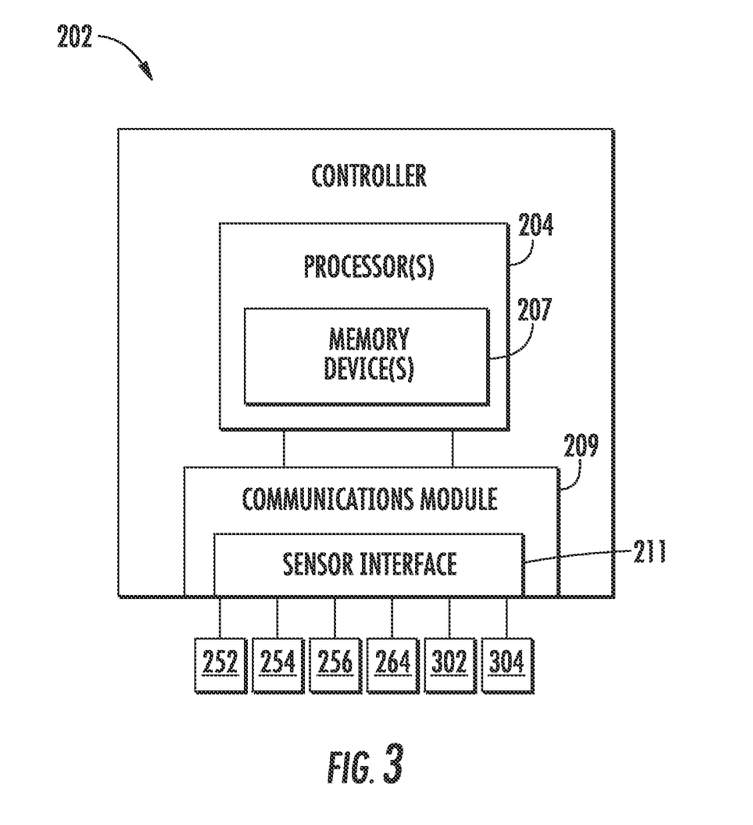
FIG. 3 illustrates a block diagram of one embodiment of a controller suitable for use with the wind turbine shown in FIG. 1.

In addition, the electrical and control system 200 may include a wind turbine controller 202 configured to control any of the components of the wind turbine 100. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264, 302, 304) may be communicatively coupled to the communications module 209 using any suitable means. For example, as shown in FIG. 3, the sensors 252, 254, 256, 264, 302, 304 may be coupled to the sensor interface 211 via a wired connection. However, in other embodiments, the sensors 252, 254, 256, 264, 302, 304 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 264 (all shown in FIG. 2), and/or any other suitable sensors. Further, the voltage and electric current sensors 252, 254, 256, 264 may be configured to measure, directly or indirectly, a power output of the wind turbine 100.

It should also be understood that any number or type of sensors may be employed within the wind turbine 100 and at any location. For example, the sensors may be temperature sensors, Micro Inertial Measurement Units (MIMUs), strain gauges, accelerometers, pressure sensors, temperature sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

In addition, the converter controller 262 is configured to receive one or more voltage and electric current measurement signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264. In addition, the converter controller 262 may be configured with any of the features described herein in regards to the main controller 202. Further, the converter controller 262 may be separate from or integral with the main controller 202.

Figure 4:
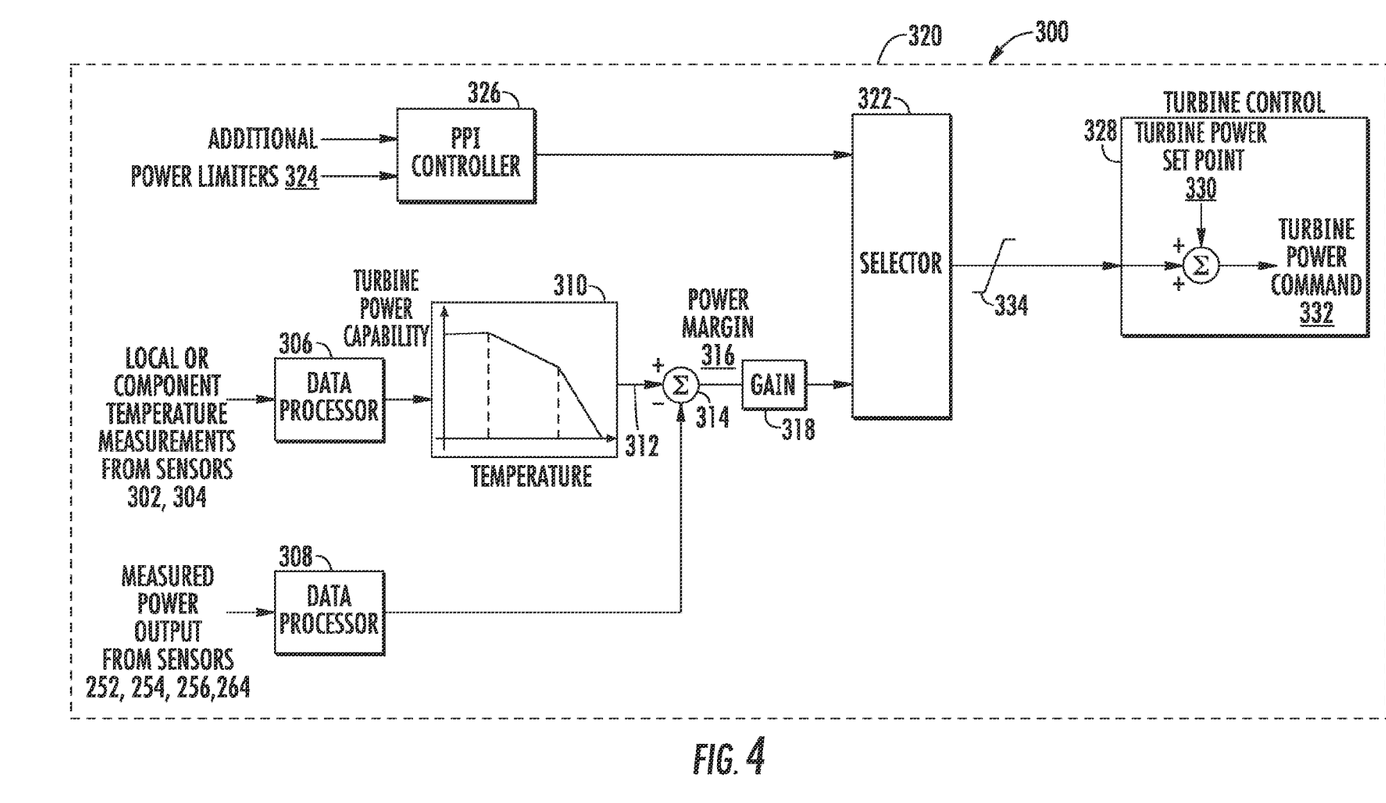
FIG. 4 illustrates a schematic diagram of one embodiment of a system for protecting a component(s) of a wind turbine according to the present disclosure; and, FIG. 5 illustrates a flow diagram of one embodiment of a method for protecting a component(s) of a wind turbine according to the present disclosure.

Referring now to FIG. 4, a schematic diagram of one embodiment of a system 300 for protecting one or more components of a wind turbine (e.g. any of the components of the wind turbine 100 of FIG. 2) is illustrated. In certain embodiments, the component(s) of the wind turbine 100 may include at least one of the power conversion assembly 210, the transformer 234, the generator 118, down-tower cables, turbine control hardware, yaw hardware, pitch hardware, or any other suitable component that experiences a temperature change as a result of a power change of the wind turbine 100. In addition, the system 300 may utilize existing wind turbine hardware, new hardware, and/or a combination thereof.

As shown, the system 300 includes one or more temperature sensors 302, 304 configured to measure a local temperature of a wind turbine component for a predetermined time period. For example, in certain embodiments, the local temperature may correspond to an actual temperature of the component, an area containing the component, a temperature inside of the component, or similar. More specifically, in particular embodiments, the temperature sensors 302, 304 may be configured with a down-tower power conversion assembly 210 of the wind turbine 100. As such, the temperature sensors 302, 304 may be configured to measure the temperature of the local down-tower area containing the power conversion assembly 210. Alternatively, the temperature sensors 302, 304 may be configured to directly measure the temperature of the power conversion assembly 210. In addition, the system 300 may also include one or more voltage and electric current sensors 252, 254, 256, 264 configured to measure the power output of the wind turbine 100 for the predetermined time period.

Still referring to FIG. 4, the system 300 includes a power controller 320 communicatively coupled to the temperature sensors 302, 304 and the voltage and electric current sensors 252, 254, 256, 264. Thus, it should be understood that the power controller 320 may be integral with the turbine controller 202 and/or the converter controller 262. Alternatively, the power controller 320 may be separate from the turbine controller 202 and/or the converter controller 262. As such, the power controller 320 is configured to implement the various method steps as described herein and may be configured similar to the turbine controller 202 and/or the converter controller 262.

For example, as shown, the power controller 320 is configured to receive the local (area or component) temperature measurements from the temperature sensors 302, 304. Thus, the power controller 320 may also further process the data, e.g. via data processor 306. Similarly, the power controller 320 is also configured to receive the measured power output from voltage and electric current sensors 252, 254, 256, 264 and may further process the data, e.g. via data processor 308. More specifically, the data processors 306, 308 may include one or more filters configured to filter the measured local temperatures for a predetermined time period and/or the measured power outputs for a predetermined time period. For example, in certain embodiments, the filters may include at least one of or a combination of the following: a low pass filter, a high pass filter, a notch filter, or similar.

In additional embodiments, the data processors 306, 308 may be configured to average the measured local temperatures and/or the measured power outputs in addition to or exclusive of filtering the data. Further, it should be understood that the predetermined time period may be any suitable time period, e.g. from about five minutes. In still further embodiments, the predetermined time period may be less than five minutes or greater than five minutes.

Still referring to FIG. 4, the power controller 320 may also be configured to determine a power capability 312 of the wind turbine 100 as a function of the local temperature measurements from sensors 302, 304 (as shown by rating curve 310). For example, as shown at 310, the power controller 320 may include a rating curve 310 (or look-up table) that includes corresponding measured temperature values and turbine power output values. As such, the power controller 320 is configured to input the processed temperature measurements into the rating curve 310, which may be used to determine a corresponding power capability 312. As used herein, the "power capability" generally refers to the amount of remaining power that may be generated by the wind turbine 100 without causing damage to the various components of the wind turbine 100, which are typically the most sensitive to increases in temperature.

Thus, the power controller 320 may be pre-programmed with certain threshold values for each of the components such that the power controller 320 can determine when such thresholds are exceeded. For example, as shown, the system 300 may include a comparator 314 that determines a power margin 316 as a function of the power capability 312 and the measured power output of the wind turbine 100 (e.g. by comparing the power capability 312 and the measured power output). Typically, the measured power output is less than the power capability 312 (i.e. the power margin 316 is positive (+)). In such a situation, the power controller 320 may continue to operate the wind turbine 100 using normal operating procedures as a positive (+) power margin 316 indicates that the wind turbine 100 is operating within allowable temperature thresholds. If, however, the measured power output is greater than the power capability 312, the power margin 316 is negative (−). In this situation, the average excessive power that has been produced beyond the turbine's capability can be used to de-rate the turbine 100 so as to protect the components from temperature-related damage while not de-rating the wind turbine 100 more than necessary. The power margin 316 is then modified by the gain 318.

Still referring to FIG. 4, in certain embodiments, the system 300 may also include a selector 322 configured to select between the output of the gain 318 and one or more additional power limiters 324 of the wind turbine 100 so as to control the power output of the wind turbine. More specifically, as shown, the additional power limiters 324 of the wind turbine 100 may include at least one of a current, a voltage, a temperature, or any other suitable power limiting parameters of one or more wind turbine components. Further, the additional power limiters 324 may be further processed through a controller, e.g. a proportional plus integral (PPI) controller 326. In further embodiments, the controller 320 may also include any other suitable controller including but not limited to a proportional (P) controller, a proportional integral (PI) controller, a proportional integral derivative (PID) controller, a proportional derivative (PD) controller, or similar. For example, in one embodiment, the selector 322 may be configured to select the power limiter (i.e. either the output of the gain 318 or one of the additional power limiters 324) that is configured to limit the power output of the wind turbine 100 the most. It should also be understood that certain embodiments of the system 300 may not include the selector 322 or the additional power limiters 324 and may simply operate the wind turbine 100 based on the power margin 316 and the gain 318 alone.

After the selection is made (or the power margin 316 is determined in embodiments without a selector 322), the power controller 320 is configured to determine a power command 332 for the wind turbine 100 as a function of the selection (or simply the power margin 316) and a power set point 330 of the wind turbine 100 as shown at 328. In a further embodiment, the power controller 320 may also include a limiter 334 configured to limit the output of the selector 322 such that the signal going into the turbine control 328 cannot be negative.

Thus, the power command 332 is configured to de-rate the wind turbine 100 in an effort to reduce the local temperature of the component. For example, as mentioned, when the measured power output is greater than the power capability 312, the power margin 316 is negative (−). As such, the power controller 320 can determine the power command 332 by adding the output of the gain 318 to the turbine power set point 330. Thus, the resulting power command 332 may be less than the turbine power set point 330 and therefore de-rates the turbine 100. However, in further embodiments, where the power margin is positive (+), the limiter 334 prevents the power controller 320 from up-rating the turbine 100 above its allowable limits. In still further embodiments, the turbine power set point 330 may correspond to the maximum power and the turbine power command 332 may be a limit to the turbine power set point 330.

Figure 5:
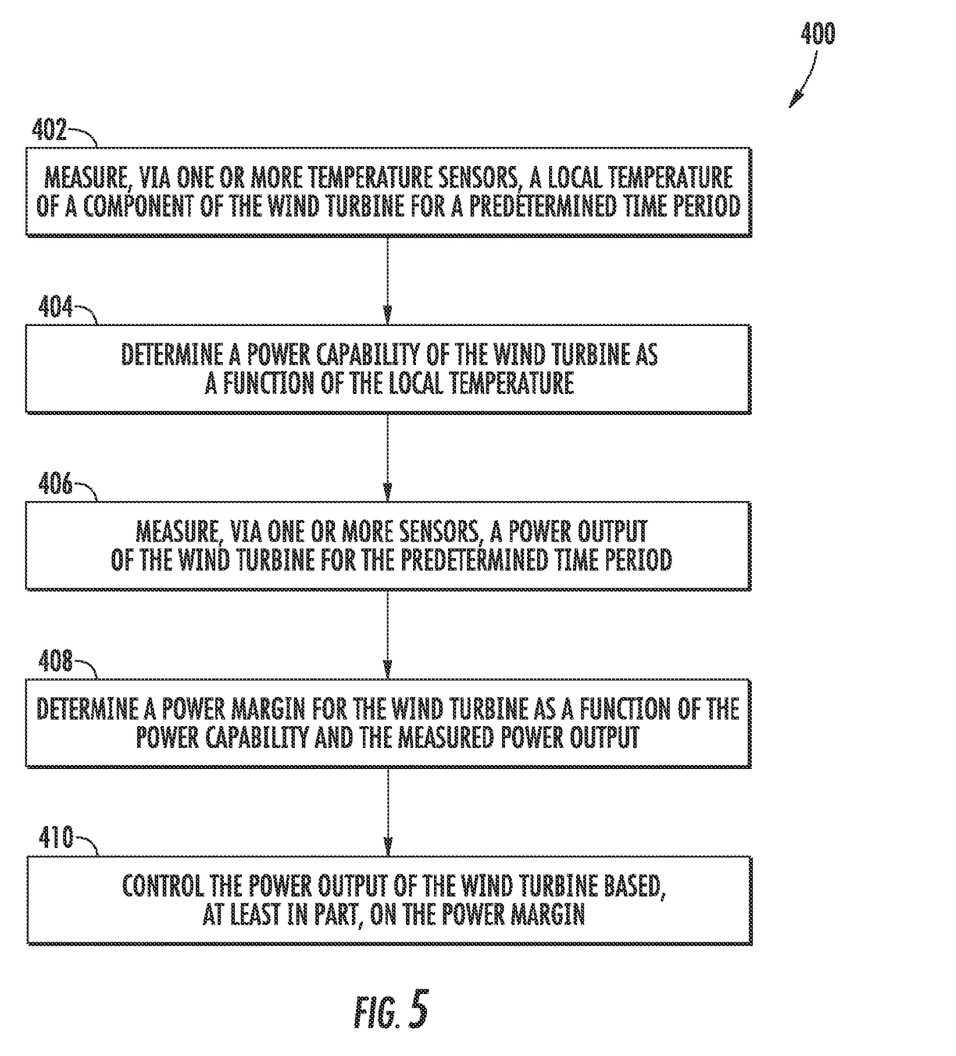

Referring now to FIG. 5, a flow diagram of one embodiment of a method 400 for operating a wind turbine 100 is illustrated. As shown at 402, the method 400 includes measuring, via one or more temperature sensors, a local temperature of a component for a predetermined time period. As shown at 404, the method 400 includes determining a power capability of the wind turbine as a function of the local temperature. As shown at 406, the method 400 includes measuring, via one or more sensors, a power output of the wind turbine for the predetermined time period. As shown at 408, the method 400 includes determining a power margin for the wind turbine as a function of the power capability and the measured power output. Thus, as shown at 410, the method 400 includes controlling the power output of the wind turbine based, at least in part, on the power margin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, the method comprising:
measuring, via one or more temperature sensors, a local temperature of a component of the wind turbine for a predetermined time period;
averaging the measured local temperature for the predetermined time period;
determining a power capability of the wind turbine as a function of the local temperature;
measuring, via one or more sensors, a power output of the wind turbine for the predetermined time period;
averaging the measured power outputs for the predetermined time period;
determining a power margin of the wind turbine as a function of the power capability and the measured power output; and,
controlling the power output of the wind turbine based, at least in part, on the power margin.

2. The method of claim 1, wherein the local temperature comprises at least one of an actual temperature of the component, an area containing the component, or a temperature inside of the component.

3. The method of claim 1, further comprising analyzing the measured local temperatures and the measured power outputs for the predetermined time period.

4. The method of claim 3, wherein analyzing the measured local temperatures and the measured power outputs for the predetermined time period further comprises filtering, via one or more data processors, the measured local temperatures for the predetermined time period and filtering, via one or more filters, the measured power outputs for the predetermined time period.

5. The method of claim 4, wherein the one or more data processors further comprise at least one of or a combination of the following: a low pass filter, a high pass filter, or a notch filter.

6. The method of claim 1, wherein controlling the power output of the wind turbine based, at least in part, on the power margin further comprises de-rating the power output of the wind turbine when the measured power output exceeds the power capability.

7. The method of claim 1, wherein the component in the wind turbine further comprises at least one of a power conversion assembly, a transformer, a generator, downtower cables, turbine control hardware, yaw hardware, or pitch hardware.

8. The method of claim 1, wherein controlling the power output of the wind turbine based, at least in part, on the power margin further comprises determining a gain of the power margin and selecting to control the power output of the wind turbine based on at least one of the gain or one or more additional power limiters of the wind turbine.

9. The method of claim 8, wherein controlling the power output of the wind turbine based, at least in part, on the power margin further comprises determining a power command for the wind turbine as a function of the selection and a power set point of the wind turbine.

10. The method of claim 9, further comprising limiting the power command such that the power command does not exceed the power output set point.

11. The method of claim 8, wherein the one or more additional power limiters of the wind turbine comprise at least one of a current, a voltage, or a temperature of one or more wind turbine components.

12. A method for operating a wind turbine, the method comprising:
measuring, via one or more temperature sensors, a temperature of or near a power conversion assembly of the wind turbine for a predetermined time period;
averaging the measured local temperatures for the predetermined time period;
determining a power capability of the wind turbine as a function of the temperature;
measuring, via one or more sensors, a power output of the wind turbine for the predetermined time period;
averaging the measured power outputs for the predetermined time period;
comparing the power capability with the measured power output; and,
de-rating the power output of the wind turbine when the measured power output exceeds the power capability.

13. A system for operating a wind turbine, the system comprising:
one or more temperature sensors configured to measure a local temperature of a component of the wind turbine for a predetermined time period;
one or more voltage and electric current sensors configured to measure and average a power output of the wind turbine for the predetermined time period; and,
a controller communicatively coupled to the temperature sensors and the voltage and electric current sensors, the controller configured to perform one or more operations, the one or more operations comprising:
determining a power capability of the wind turbine as a function of the average local temperature over the predetermined time period;
comparing the power capability with the averaged measured power output over the predetermined time period; and,
de-rating the power output of the wind turbine when the measured power output exceeds the power capability.

14. The system of claim 13, wherein the local temperature comprises at least one of an actual temperature of the component, an area containing the component, or a temperature inside of the component.

15. The system of claim 13, wherein the controller comprises one or more data processors configured to filter at least one of the measured local temperatures for the predetermined time period or the measured power outputs for the predetermined time period, wherein the one or more data processors further comprise at least one of or a combination of the following: a low pass filter, a high pass filter, or a notch filter.

16. The system of claim 13, wherein the component in the wind turbine further comprises at least one of a power conversion assembly, a transformer, a generator, downtower cables, turbine control hardware, yaw hardware, or pitch hardware.

17. The system of claim 13, further comprising a selector configured to select between the power margin or one or more additional power limiters of the wind turbine to control the power output of the wind turbine.

18. The system of claim 17, further comprising determining a power command for the wind turbine as a function of the selection and a power output set point of the wind turbine.

19. The system of claim 18, further comprising a limiter configured to restrict the power command such that the power command does not exceed the power output set point.

* * * * *